(12) United States Patent
Balakrishnan et al.

(10) Patent No.: US 10,003,270 B2
(45) Date of Patent: *Jun. 19, 2018

(54) REDUCTION OF AUDIBLE NOISE IN A POWER CONVERTER

(71) Applicant: POWER INTEGRATIONS, INC., San Jose, CA (US)

(72) Inventors: Vikram Balakrishnan, Mountain View, CA (US); Giao Minh Pham, Milpitas, CA (US); Ricardo Luis Janezic Pregitzer, Campbell, CA (US); Peter Vaughan, Los Gatos, CA (US)

(73) Assignee: Power Integrations, Inc., San Jose, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/854,538

(22) Filed: Dec. 26, 2017

(65) Prior Publication Data

US 2018/0123465 A1 May 3, 2018

Related U.S. Application Data

(63) Continuation of application No. 15/055,337, filed on Feb. 26, 2016, now Pat. No. 9,893,630.

(51) Int. Cl.
*H02M 3/335* (2006.01)
*H02M 1/08* (2006.01)
(Continued)

(52) U.S. Cl.
CPC ......... *H02M 3/33515* (2013.01); *H02M 1/08* (2013.01); *H02M 3/156* (2013.01);
(Continued)

(58) Field of Classification Search
CPC ... H02M 3/335; H02M 3/33507; H02M 3/156
See application file for complete search history.

(56) References Cited

U.S. PATENT DOCUMENTS 6,525,514 B1 2/2003 Balakrishnan et al.
9,214,851 B1 12/2015 Mao et al.
(Continued)

OTHER PUBLICATIONS

European Application No. 17153948.9—Extended European Search Report dated Jul. 20, 2017, 8 pages.

*Primary Examiner* — Timothy J Dole
*Assistant Examiner* — Ishrat Jamali
(74) *Attorney, Agent, or Firm* — Christensen O'Connor Johnson Kindness PLLC (57) ABSTRACT

A controller includes a drive circuit that generates a drive signal to switch a power switch to control a transfer of energy to of a power converter output in response to a current sense signal, a feedback signal, and a current limit signal. A current limit generator generates the current limit signal in response to a load coupled to the output. An exclusion frequency range detection circuit generates a frequency skip signal in response to the drive signal to indicate when an intended frequency of the drive signal is within an exclusion frequency window. The current limit signal is unvarying for at least a switching cycle when the intended frequency of the drive signal is within the exclusion frequency window. A first latch generates a hold signal to control the current limit generator to hold the current limit signal in response to the frequency skip signal and the feedback signal.

21 Claims, 6 Drawing Sheets

(51) Int. Cl.
*H02M 3/156* (2006.01)
*H02M 1/00* (2006.01)

(52) U.S. Cl.
CPC ....... *H02M 3/335* (2013.01); *H02M 3/33507* (2013.01); *H02M 2001/0009* (2013.01); *H02M 2001/0032* (2013.01)

(56) References Cited

U.S. PATENT DOCUMENTS

| | | |
|---|---|---|
| 9,246,392 B2 | 1/2016 | Balakrishnan et al. |
| 2007/0047268 A1 | 3/2007 | Djenguerian et al. |
| 2010/0302811 A1 | 12/2010 | Saint-Pierre |
| 2014/0177290 A1 | 6/2014 | Zhang et al. |
| 2015/0200599 A1 | 7/2015 | Mao et al. |
| 2015/0295500 A1 | 10/2015 | Mao et al. |
| 2015/0303812 A1 | 10/2015 | Mao et al. |
| 2017/0250614 A1 | 8/2017 | Pregitzer et al. |

REDUCTION OF AUDIBLE NOISE IN A POWER CONVERTER

CROSS-REFERENCE TO RELATED APPLICATIONS

This application is a continuation of U.S. patent application Ser. No. 15/055,337, filed on Feb. 26, 2016, now pending. U.S. patent application Ser. No. 15/055,337 is hereby incorporated by reference.

BACKGROUND INFORMATION

Field of the Disclosure

The present invention relates generally to power converters, and more specifically controllers reducing the effects of audible noise associated with low switching frequencies during light load conditions.

Background

Electronic devices use power to operate. Switched mode power converters are commonly used due to their high efficiency, small size and low weight to power many of today's electronics. Conventional wall sockets provide a high voltage alternating current. In a switch mode power converter, a high voltage alternating current (ac) input is converted to provide a well-regulated direct current (dc) output through an energy transfer element. The switched mode power converter control circuit usually provides output regulation by sensing one or more inputs representative of one or more output quantities and controlling the output in a closed loop. In operation, a switch is utilized to provide the desired output by varying the duty cycle (typically the ratio of the on time of the switch to the total switching period), varying the switching frequency, or varying the number of pulses per unit time of the switch in a switched mode power converter.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

A controller for a power converter controls the switching of the power switch for delivering energy to a load. For a power converter such as a flyback converter, a transformer is used to transfer energy from an input winding to an output winding. During a light load condition, the switching frequency of the power switch decreases in order to reduce power dissipation as required per efficiency requirements. For switching frequencies below 20 kHz, the mechanical resonance of the transformer contributes to audible noise. Examples in accordance with the teachings of the present invention reduce the effect of audible noise by preventing the switching of the power switch at certain frequencies. In another example, switching within a frequency range can also be omitted, such that switching of the power switch at certain frequencies is prohibited.

The controller for the power converter adjusts the current limit of the power switch depending on the load. During a light load condition, the controller may dramatically increase the current limit, which injects more energy that may consequently add to the audible noise. Examples in accordance with the teachings of the present invention may hold the current limit under certain conditions for a number of cycles to reduce audible noise. In other words, the state of the current limit may remain fixed for one or more cycles during a light load condition.

Figure 1:
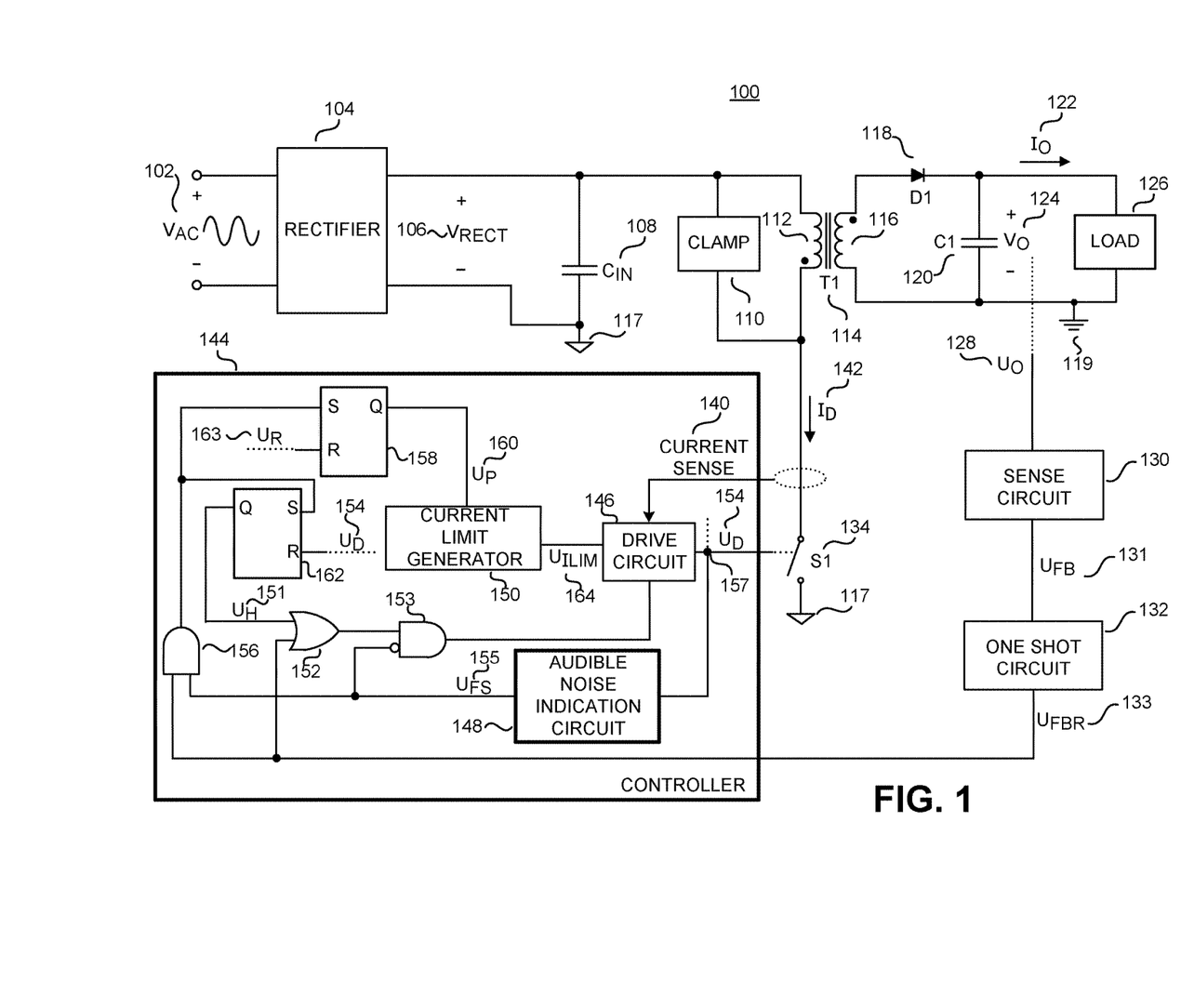
FIG. 1 shows a block diagram schematic of one example of a flyback switch mode power converter that includes a controller, in accordance with the teachings of the present invention.

To illustrate, FIG. 1 shows a functional block diagram of an example power converter 100 is illustrated including ac input voltage $V_{AC}$ 102, a rectifier 104, a rectified voltage $V_{RECT}$ 106, an energy transfer element T1 114, a primary winding 112 of the energy transfer element T1 114, a secondary winding 116 of the energy transfer element T1 114, a power switch S1 134, input return 117, a clamp circuit 110, a rectifier D1 118, an input capacitor $C_{IN}$ 108, an output capacitor C1 120, a load 126, a sense circuit 130, a one shot circuit 132, and a controller 144.

Controller 144 further includes a drive circuit 146, an audible noise indication circuit 148, a current limit generator circuit 150, logic gates 152, 153, 156, and latches 158, 162. Controller 144 further includes a drive signal $U_D$ 154, a frequency skip signal $U_{FS}$ 155, a reset signal $U_R$ 163, a pause signal $U_P$ 160, and a current limit signal $U_{ILIM}$ 164.

FIG. 1 further illustrates an output voltage $V_O$ 124, an output current $I_O$ 122, an output quantity $U_O$ 128, a feedback signal $U_{FB}$ 131, a drain current $I_D$ 142, a current sense signal 140, and a feedback request signal $U_{FBR}$ 133.

The example switched mode power converter 100 illustrated in FIG. 1 is coupled in a flyback configuration, which is just one example of a switched mode power converter that may benefit from the teachings of the present invention. It is appreciated that other known topologies and configurations of switched mode power converters may also benefit from the teachings of the present invention. In addition, the example power converter shown in FIG. 1 is an isolated power converter. It should be appreciated that non-isolated power converters may also benefit from the teachings of the present invention.

The power converter 100 provides output power to the load 126 from an unregulated input voltage. In one embodiment, the input voltage is the ac input voltage $V_{AC}$ 102. In another embodiment, the input voltage is a rectified ac input voltage such as rectified voltage $V_{RECT}$ 106. The rectifier 104 outputs rectified voltage $V_{RECT}$ 106. In one embodiment, rectifier 104 may be a bridge rectifier. The rectifier 104 further couples to the energy transfer element T1 114. In some embodiments of the present invention, the energy transfer element T1 114 may be a coupled inductor. In other embodiments, the energy transfer element T1 114 may be a transformer. In a further example, the energy transfer element T1 114 may be an inductor. In the example of FIG. 1, the energy transfer element T1 114 includes two windings, a primary winding 112 and a secondary winding 116. However, it should be appreciated that the energy transfer element T1 114 may have more than two windings. In the example of FIG. 1, primary winding 112 may be considered an input winding, and secondary winding 116 may be considered an output winding. The primary winding 112 is further coupled to switch S1 134, which is then further coupled to input return 117.

In addition, the clamp circuit 110 is illustrated in the example of FIG. 1 as being coupled across the primary winding 112 of the energy transfer element T1 114. The input capacitor $C_{IN}$ 108 may be coupled across the primary winding 112 and switch S1 134. In other words, the input capacitor $C_{IN}$ 108 may be coupled to the rectifier 104 and input return 117.

Secondary winding 116 of the energy transfer element T1 114 is coupled to the rectifier D1 118. In the example of FIG. 1, the rectifier D1 118 is exemplified as a diode. However, in some embodiments the rectifier D1 118 may be a transistor used as a synchronous rectifier. Both the output capacitor C1 120 and the load 126 are shown in FIG. 1 as being coupled to the rectifier D1 118. An output is provided to the load 126 and may be provided as either a regulated output voltage $V_O$ 124, regulated output current $I_O$ 122, or a combination of the two.

The power converter 100 further comprises circuitry to regulate the output, which is exemplified as output quantity $U_O$ 128. In general, the output quantity $U_O$ 128 is either an output voltage $V_O$ 124, an output current $I_O$ 122, or a combination of the two. A sense circuit 130 is coupled to sense the output quantity $U_O$ 128 and to provide feedback signal $U_{FB}$ 131, which is representative of the output quantity $U_O$ 128. Feedback signal $U_{FB}$ 131 may be a voltage signal or a current signal. In one example, the sense circuit 130 may sense the output quantity $U_O$ 128 from an additional winding included in the energy transfer element T1 114.

In another example, there may be a galvanic isolation (not shown) between the controller 144 and the sense circuit 130. The galvanic isolation could be implemented by using devices such as an opto-coupler, a capacitor or a magnetic coupling. In a further example, the sense circuit 130 may utilize a voltage divider to sense the output quantity $U_O$ 128 from the output of the power converter 100.

Controller 144 is coupled to the sense circuit 130 and receives the feedback request signal $U_{FBR}$ 133 from the one shot circuit 132. The controller 144 further includes terminals for receiving the current sense signal 140, and provides a drive signal $U_D$ 154 to power switch S1 134. The current sense signal 140 may be representative of the drain current $I_D$ 142 in the power switch S1 134. Current sense signal 140 may be a voltage signal or a current signal. In addition, controller 144 provides drive signal $U_D$ 154 to the power switch S1 134 to control various switching parameters to control the transfer of energy from the input of power converter 100 to the output of power converter 100. Examples of such parameters may include switching frequency, switching period, duty cycle, or respective ON and OFF times of the power switch S1 134.

In operation, once the feedback signal $U_{FB}$ 131 drops below a certain threshold, the one shot circuit 132 is activated. The one shot circuit 132 is coupled to output a feedback request signal $U_{FBR}$ 133 to controller 144. In one example, the feedback request signal $U_{FBR}$ 133 is a pulse. In one example, the length of the pulse can be a constant value. In another example, the length of the pulse can vary. The feedback request signal $U_{FBR}$ 133 indicates to controller 144, a parameter such as an output voltage or current has dropped below a threshold, and controller 144 should turn on the power switch S1 134.

During a light load condition, a request for more power may arise during a period that occurs during a frequency that is associated with audible noise. The audible noise indication circuit 148 of controller 144 is coupled to receive the drive signal $U_D$ 154 and output a frequency skip signal $U_{FS}$ 155. If a feedback request signal $U_{FBR}$ 133 is received that would cause the drive signal $U_D$ 154 would switch within a frequency of the exclusion window, such as for example an audible noise window, power switch S1 134 is not allowed to switch. In one example, controller 144 does not switch the power switch S1 134 within a frequency window from 7 kHz to 15 kHz. The frequency skip signal $U_{FS}$ 155 may transition from a logic low to a logic high if the delay time after the drive signal $U_D$ 154 reaches the period of the maximum audible noise frequency. The frequency skip signal $U_{FS}$ 155 may transition from a logic high to a logic low if the intended frequency of the drive signal $U_D$ 154 is outside the audible noise window. In other words, the frequency skip signal $U_{FS}$ 155 may transition from a logic high to a logic low when the delay time after the drive signal $U_D$ 154 equals to the period of the minimum audible noise frequency range.

The operation of controller 144 in which the feedback request signal $U_{FBR}$ 133 is received outside the audible noise window will now be described. A drive signal $U_D$ 154 transitions from a logic low to logic high when a feedback request signal $U_{FBR}$ 133 is received. Logic gate 156 is coupled to receive the feedback request signal $U_{FBR}$ 133 at the first input and the frequency skip signal $U_{FS}$ 155 at the second input. In one example, logic gate 156 is an AND gate. If the frequency skip signal $U_{FS}$ 155 is a logic low, the output of logic gate 156 is a logic low. The output of logic gate 156 is coupled to latches 158, 162. The output of latch 162 generates a hold signal $U_H$ 151. The hold signal $U_H$ 151 corresponds to when the power switch should not switch. In normal operation, the hold signal $U_H$ 151 is a logic low. The output of latch 162 is reset every time the drive signal $U_D$ 154 is triggered. The output of latch 158 generates a pause signal $U_D$ 160 that corresponds to latching the current limit state. In normal operation, the hold signal $U_H$ 151 is a logic low.

The current limit generator circuit 150 is coupled to receive the pause signal $U_D$ 160 and output a current limit signal $U_{ILIM}$ 164 to the drive circuit 146. During normal operation, the current limit signal $U_{ILIM}$ 164 can be adjusted accordingly.

The operation of controller 144 in which the received feedback request signal $U_{FBR}$ 133 occurs inside the audible noise window will be now be described. During this operation, the frequency skip signal $U_{FS}$ 155 of the audible noise indication circuit 148 transitions to a logic high. The output of logic gate 156 transitions to a logic high and sets latches 158, 162. The output of latch 162 generates a logic high hold signal $U_H$ 151. Logic gate 152 is coupled to receive the hold signal $U_H$ 151 and feedback request signal $U_{FBR}$ 133. In one example, logic gate 152 is an OR gate. Logic gate 153 is coupled to receive the output of logic gate 152 and the frequency skip signal $U_{FS}$ 155. In one example, logic gate 153 is an AND gate with one of the inputs coupled to an inverter. The output of logic gate 153 is coupled to the drive circuit 146 to provide an ON signal.

When the output of logic gate 156 is a logic high, the pause signal $U_P$ 160 transitions to a logic high to indicate the state of the current limit should remain frozen for one or more switching cycles. The output of latch 160 may be reset by a reset signal $U_R$ 163. In one example, the reset signal may be generated from a counter circuit that corresponds to counting the switching cycles.

The current limit generator circuit 150 is also coupled to receive the pause signal $U_P$ 160 and output a current limit $U_{ILIM}$ 164 to the drive circuit 146. As stated previously, raising the current limit during a window of the audible noise range may contribute to audible noise. As such, the current limit $U_{ILIM}$ 164 may remain fixed for consecutive switching cycles. In one example, the current limit may remain fixed for a minimum of one switching cycle and a maximum of four switching cycles. The state of the current limit will remain paused. In another example, the current limit $U_{ILIM}$ 164 may be reduced or increased depending on the design.

In another example, the audible noise indication circuit 148 can operate to exclude a particular frequency window.

In other words, the switching drive signal $U_D$ 154 can be precluded from switching from any range depending on the application.

Figure 2A:
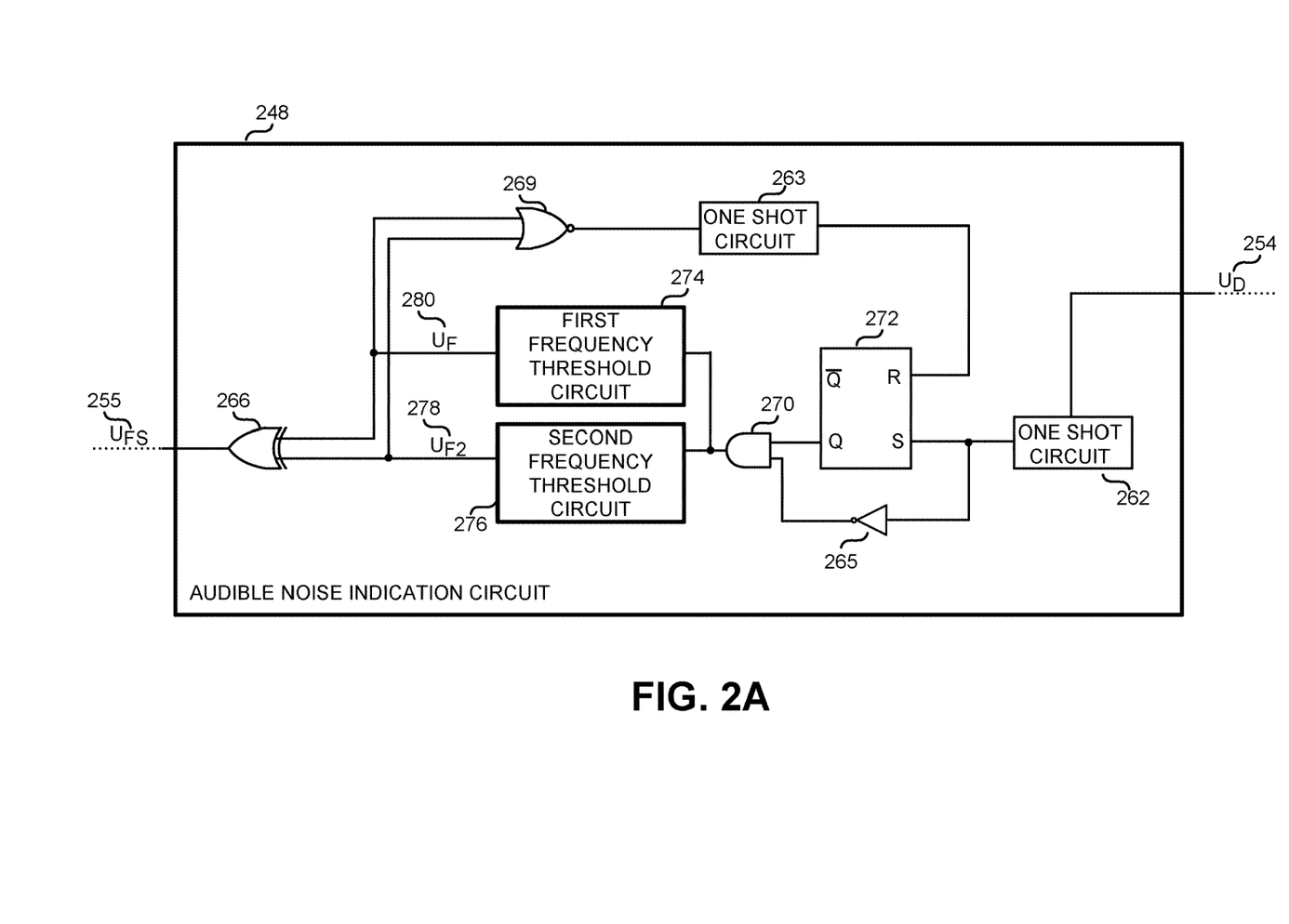
FIG. 2A shows a block diagram schematic of an example audible noise indication circuit, in accordance with the teachings of the present invention.

FIG. 2A shows a block diagram schematic of an example audible noise indication circuit, in accordance with the teachings of the present invention. The audible noise indication circuit 248 includes a one shot circuits 262, 263, latch 272, a first frequency threshold circuit 274, a second frequency threshold circuit 276, and logic gates 266, 269, 270 and inverter 265. The audible noise indication circuit 248 is coupled to receive the drive signal $U_D$ 254, and output the frequency skip signal $U_{FS}$ 255.

The operation to determine if the feedback request signal would induce an intended drive signal $U_D$ 254 to switch within a frequency exclusion window, such as for example an audible noise window, is now described. The audible noise detection circuit 248 resets the first frequency threshold circuit 274 and second frequency circuit 276 prior to determining if the feedback request signal would induce an intended drive signal $U_D$ 254 to switch within a frequency exclusion window. A drive signal $U_D$ 254 activates a one shot circuit 262. The output of the one shot circuit 262 is coupled to set a latch 272. Latch 272 stores the request to enable the first frequency and second frequency threshold circuit 276. The output terminal of latch 272 is coupled to a logic gate 270. In one example, logic gate 270 is an AND gate. Logic gate 270 is coupled to receive the output latch 272 at a first input, and the output of inverter 265 at a second input. The stored request of latch 272 is allowed to propagate from logic gate 270 when the pulse of the drive signal $U_D$ 254 transitions to a logic low. The output of logic gate 270 is coupled to a first frequency threshold circuit 274 and second frequency threshold circuit 276. The first frequency threshold circuit 274 is coupled to output a first frequency signal $U_F$ 280 indicating when a first time period has been reached. In one example, the first time period can correspond to a first frequency such as 7 kHz. The second frequency threshold circuit 276 is coupled to output a second frequency signal $U_{F2}$ 278 indicating when a second time period has been reached. In on example, the second time period can correspond to a second frequency such as 15 kHz. The first frequency signal $U_F$ 280 and second frequency signal $U_{F2}$ 278 are inputs to logic gate 266. In one example, logic gate 266 is an XOR gate. Logic gate 266 is coupled to generate the frequency skip signal $U_{FS}$ 255 in response to first frequency signal $U_F$ 280 and second frequency signal $U_{F2}$ 278. The frequency skip signal $U_{FS}$ 255 remains logic high at the time periods between the first frequency signal $U_F$ 280 and second frequency signal $U_{F2}$ 278.

Latch 272 may be reset through the reset path of logic gate 269, one shot circuit 263. Latch 272 is reset once the first frequency signal $U_F$ 280 transitions to a logic low, the second frequency signal $U_{F2}$ 282 transitions to a logic low, and the drive signal $U_D$ 254 is a logic low.

The first frequency threshold circuit 274 and second frequency threshold circuit 276 are reset during each logic high of the drive signal $U_D$ 254. Logic gate 269 is coupled to receive the first frequency signal $U_F$ 280 and the second frequency signal $U_{F2}$ 278. In one example, logic gate 269 is an NOR gate. The output of logic gate 269 is a logic high when the first frequency signal $U_F$ 280 is a logic low, and the second frequency signal $U_{F2}$ is a logic low. The output of logic gate 269 is coupled to a one shot circuit 263. The output of one shot circuit 263 is coupled to the reset terminal of latch 272.

Figure 2B:
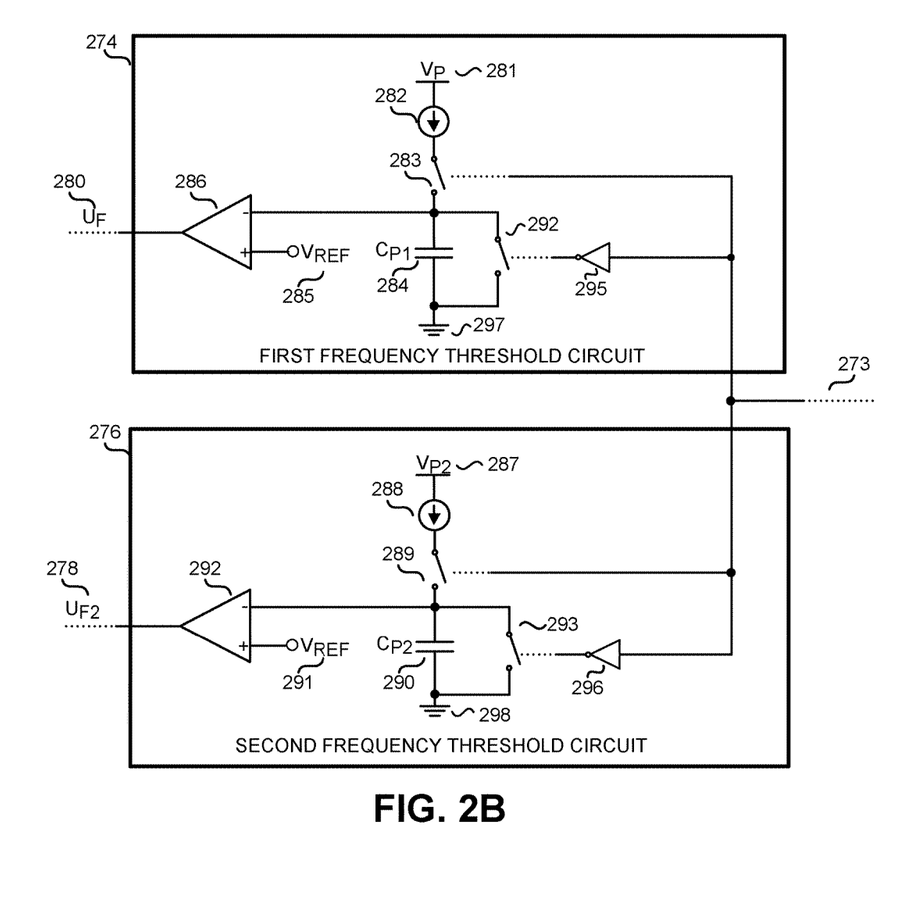
FIG. 2B shows a block diagram schematic of the first and second frequency threshold circuit, in accordance with the teachings of the present invention.

FIG. 2B shows a block diagram schematic of the first and second frequency threshold circuits 274 and 276, in accordance with the teachings of the present invention. First frequency threshold circuit 274 includes a current source 282, switches 283, 292, inverter 295, a first capacitor $C_{P1}$ 284, a comparator 286, and a ground reference 297. The first frequency threshold circuit 274 further includes a voltage potential $V_P$ 281, a voltage reference $V_{REF}$ 285, and a first frequency signal $U_F$ 280.

In operation, first frequency threshold circuit 274 and second frequency threshold circuit 276 operate the same. A switch 283 is coupled to be switched ON and OFF in response to the output signal of logic gate 270. When the switch 283 is OFF, switch 292 is ON and the first capacitor $C_{P1}$ 284 is discharged to ground reference 297. The first capacitor $C_{P1}$ 284 should be completely discharged prior to switch 283 turning ON. When switch 283 is ON and switch 292 is OFF, current source 282 with a voltage potential $V_P$ 281 charges the first capacitor $C_{P1}$ 284. The size of first capacitor $C_{P1}$ 284 and/or value of current source 282 may be selected to a fixed time period that corresponds with a first frequency. In one example, the size of the first capacitor $C_{P1}$ 284 may be larger than the second capacitor $C_{P2}$ 290. The first frequency signal $U_F$ 280 transitions to a logic low when the voltage of the first capacitor $C_{P1}$ 284 exceeds a voltage reference $V_{REF}$ 285.

Second frequency threshold circuit 276 includes a current source 288, switches 289, 293, an inverter 296, a second capacitor $C_{P2}$ 290, a comparator 292, and a ground reference 298. The second frequency threshold circuit 276 further includes a second voltage potential $V_{P2}$ 287, a voltage reference $V_{REF}$ 291, and a second frequency signal $U_{F2}$ 278.

A switch 289 is coupled to be switched ON and OFF in response the output signal 273 of latch 272. When the switch 289 is OFF and switch 293 is ON, second capacitor $C_{P2}$ 290 is discharged to ground reference 298. The second capacitor $C_{P2}$290 should be completely discharged prior to switch 289 turning ON. When switch 289 is ON and switch 293 is OFF, current source 288 with a voltage potential $V_{P2}$ 287 charges the second capacitor $C_{P2}$ 290. The size of second capacitor $C_{p2}$ 290 and/or value of current source 288 may be selected to a fixed time period that corresponds with a second frequency. The second frequency signal $U_{F2}$ 278 transitions to a logic low when the voltage of the second capacitor $C_{P2}$ 284 exceeds a voltage reference $V_{REF}$ 291.

In another example, the first frequency threshold circuit 274 and second frequency threshold circuit 276 can be implemented using a digital timer circuit. The digital timer circuit may receive a start signal from the drive signal $U_D$ 254.

Figure 3:
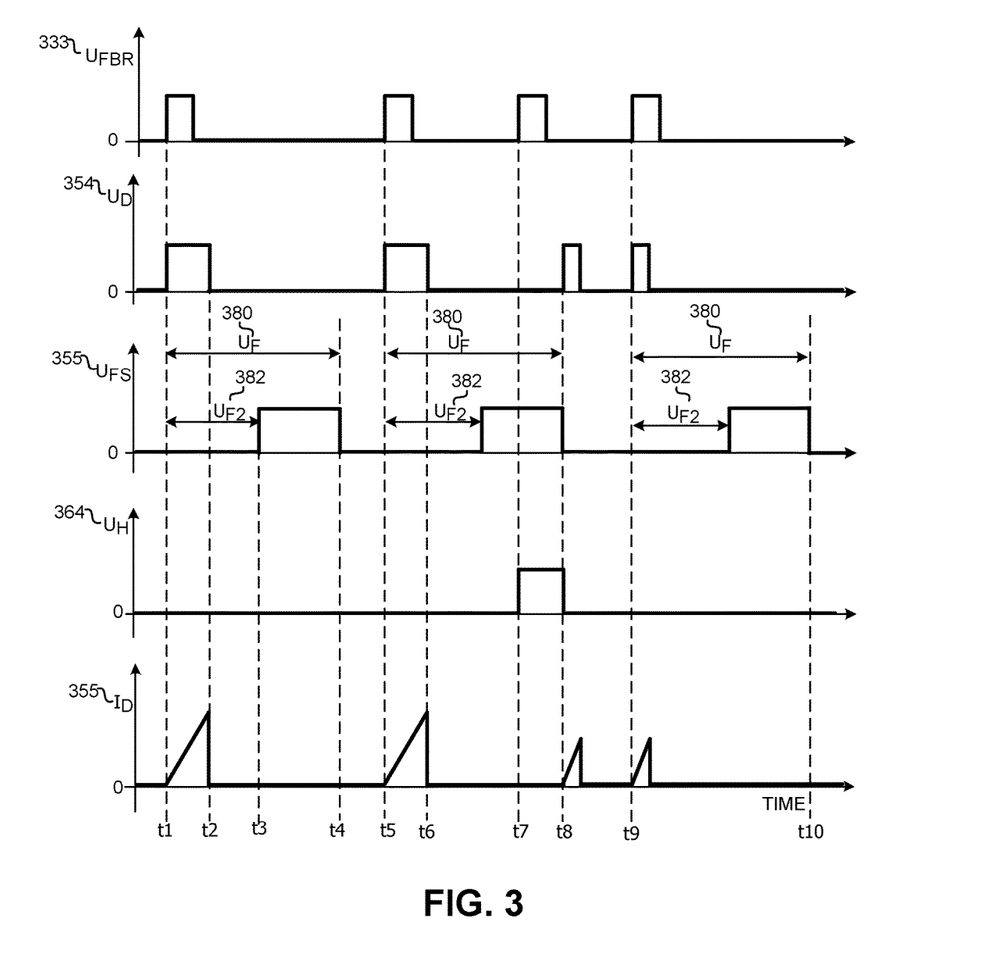
FIG. 3 illustrates an example timing diagram showing signals associated with the feedback request signal, the drive signal, the frequency skip signal, the hold signal, and drain current, in accordance with the teachings of the present invention.

FIG. 3 illustrates an example timing diagram showing signals associated with the feedback request signal, the drive signal, the frequency skip signal, the hold signal, and drain current, in accordance with the teachings of the present invention.

The first timing diagram illustrates the feedback request signal $U_{FBR}$ 333, illustrated as a series of pulses. The second timing diagram illustrates the drive signal $U_D$ 354. The third timing diagram illustrates the frequency skip signal $U_{FS}$ 355. The fourth timing diagram illustrates the hold signal $U_H$ 364. The fifth timing diagram illustrates the drain current $I_D$ 355.

During normal operation at time t1, the feedback request signal $U_{FBR}$ 333 transitions to a logic high. The controller of FIG. 1 may determine if switching of the power switch would occur within the audible noise window. If the condition is true, the frequency skip signal $U_{FS}$ 355 and hold signal transitions to a logic high.

At time t1, the frequency skip signal $U_{FS}$ 355 does not transition to a logic high, and the hold signal $U_H$ 360 is not a logic high. During every feedback request, the timers of the first frequency threshold circuit and second frequency threshold circuit are enabled as illustrated by first frequency signal $U_F$ 380 and second frequency $U_{F2}$ 382. The hold signal $U_H$ 364 remains at a logic low. During normal operation, the drive signal $U_D$ 354 transitions to a logic high with a corresponding drain current $I_D$ 355.

At time t2, the drive signal $U_D$ 354 transitions to a logic low and the drain current $I_D$ 355 falls to zero.

At time t3, the frequency skip signal $U_{FS}$ 355 transitions to a logic high. The length of the first frequency signal $U_F$ 380 and the length of the second frequency signal $U_{F2}$ correspond to their time periods. A time period is the inverse of the frequency. At time t3, no feedback request events have occurred in this time, and nothing changes as a result.

At time t4, the frequency skip signal $U_{FS}$ 355 transitions to a logic low to signal the end of the audible frequency window. At time t5, the feedback request signal $U_{FBR}$ 333 transitions to a logic high and the drive signal $U_D$ 354 transitions to a logic high to a corresponding drain current $I_D$ 355. At time t6, the drive signal $U_D$ 354 transitions to a logic low, and the drain current $I_D$ 355 falls to zero. The first frequency threshold circuit and second frequency threshold circuit are also enabled.

At time t7, the feedback request signal $U_{FBR}$ 333 transitions to a logic high. The hold signal $U_H$ 364 transitions to a logic high when the feedback request signal is received during a time that occurs within the audible noise window. In other words, the hold signal $U_H$ 364 transitions to a logic high in response to the feedback request signal $U_{FBR}$ 333 logic high state and when the frequency skip signal $U_{FS}$ 355 is also a logic high. The drive signal $U_D$ 354 is not allowed to transition to a logic high signal until the end of the audible noise window.

At time t8, the drive signal $U_D$ 354 transitions to a logic high when the frequency skip signal $U_{FS}$ 355 is a logic low and the hold signal $U_H$ 360 is a logic high. Once the drive signal $U_D$ 354 is allowed to transition, the hold signal $U_H$ 364 transitions to a logic low. As mentioned previously, the current limit may be held for more than one switching cycle. In other words, the current limit may remain the same value for consecutive switching cycles. In one example, the value may represent thirty percent of the full current limit. As illustrated at time t8, the drain current $I_D$ 355 is a reduced value in comparison to the drain currents of time t1 and time t5.

At time t9, the feedback request signal $U_{FBR}$ 333 transitions to a logic high. The timers of the first and second frequency threshold circuit are enabled. The drive signal $U_D$ 354 transitions to a logic high with the corresponding drain current $I_D$ 355. At some time after t9, the frequency skip signal $U_{FS}$ 355 transitions to a logic high. At time t10, the frequency skip signal $U_{FS}$ 355 transitions to a logic low.

Figure 4:
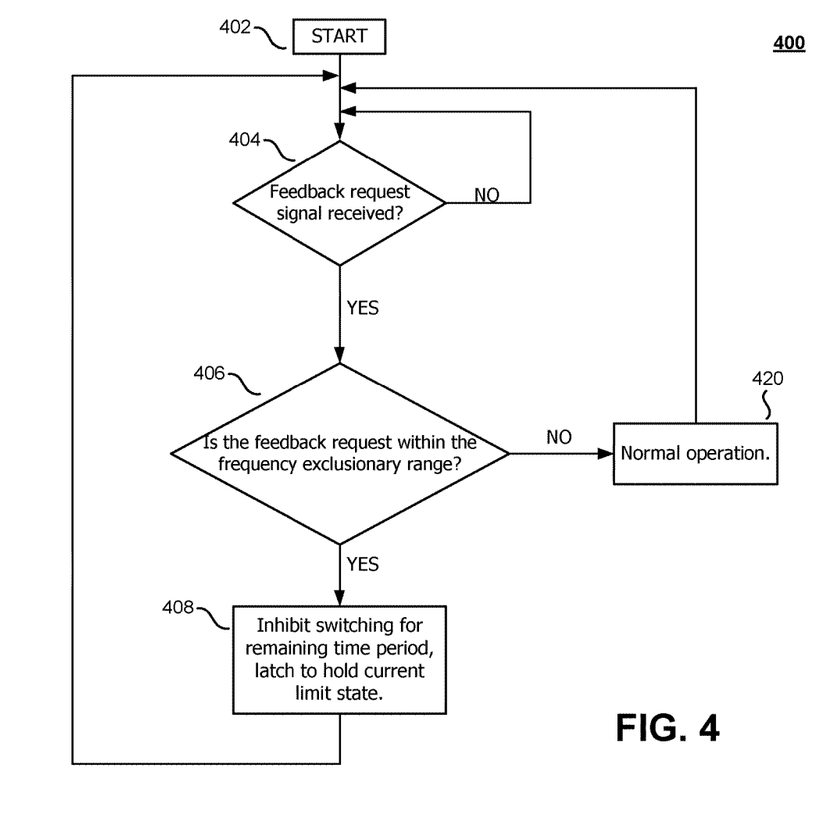
FIG. 4 is a flow chart illustrating an example process of storing the current state of the current limit, in accordance with the teachings of the present invention.

FIG. 4 is a flow chart illustrating an example process of holding the current limit used to control a switch mode power converter, in accordance with the teachings of the present invention. Process 400 begins at the START block 402. Process 400 proceeds to block 404. At decision block 404, the controller (e.g., controller 144 of FIG. 1) determines if a feedback request signal has been received. If the feedback request signal has not been received, process 400 loops back to decision block 404. If a feedback request signal has been received, process 400 proceeds to decision block 406. At decision block 406, the audible noise indication circuit determines if the feedback request is within the frequency exclusionary range. If the feedback request is not within the frequency exclusionary range, process 400 proceeds to block 420. At block 420, the controller is not in a light load condition, and the controller resumes normal operation. Process 400 loops back to the beginning.

If the feedback request is within the frequency exclusionary range, process 400 proceeds to block 408. At block 408, switching of the power switch is inhibited for a remaining time period of the frequency exclusionary range. The current state of the current limit is latched.

Figure 5:
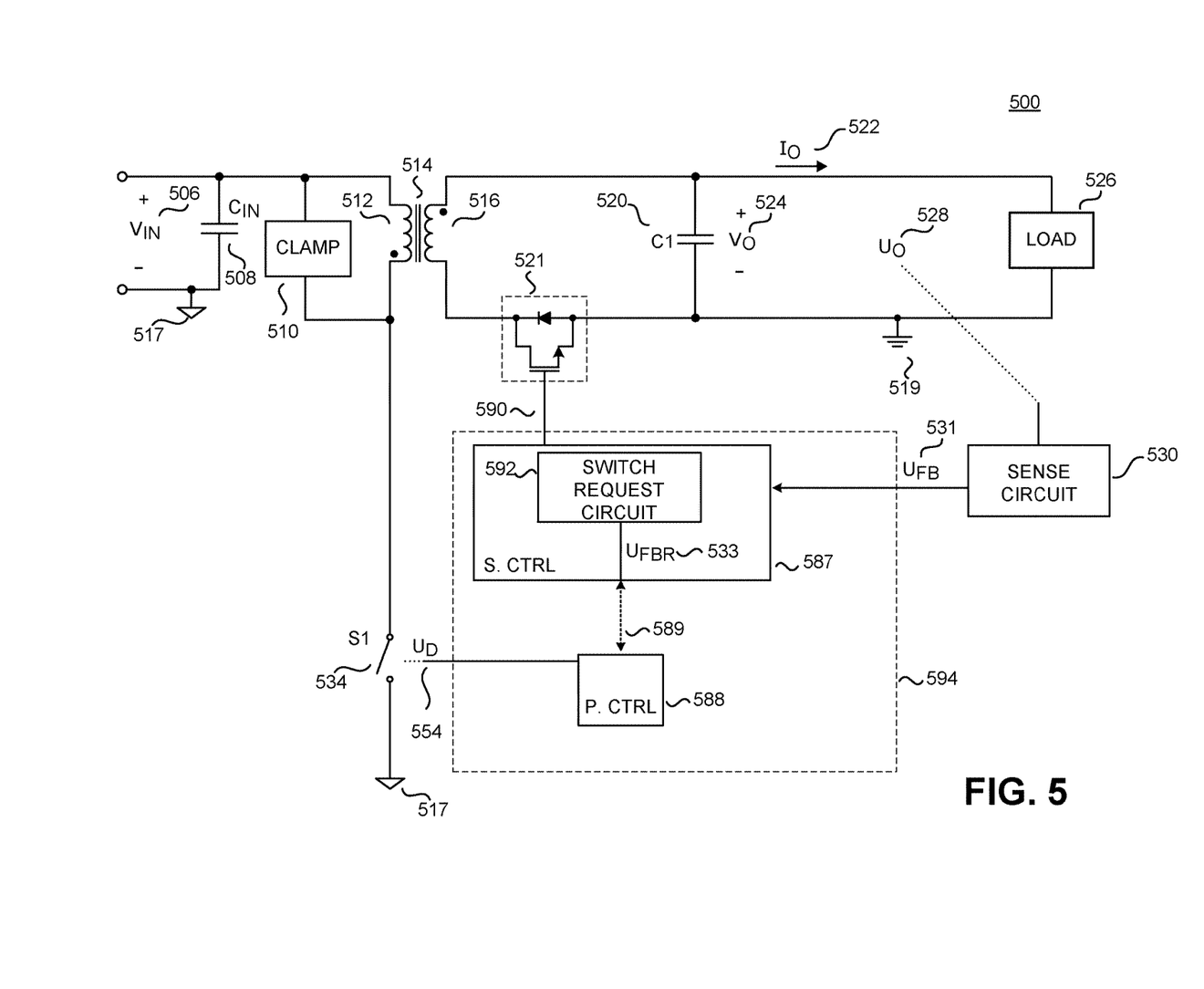
FIG. 5 shows a schematic of one example of a flyback switch mode power converter that includes a primary controller coupled to receive a feedback request signal from a secondary controller, in accordance with the teachings of the present invention.

FIG. 5 shows a schematic of one example of a flyback switch mode power converter that includes a primary controller coupled to receive a feedback request signal from a secondary controller, in accordance with the teachings of the present invention. As shown in the depicted example, power converter 500 further includes an input capacitor 508, an input return 517, a clamp circuit 510, an energy transfer element T1 514, a primary winding 512, a secondary winding 516, a power switch S1 534, an output capacitor C1 520, an output rectifier 521, output return 519, and a sense circuit 530. Further illustrated in FIG. 5 are the input voltage $V_{IN}$ 506, output voltage $V_O$ 524, output current $I_O$ 522, output quantity $U_O$ 528, and secondary drive signal 590. Controller 594 is further illustrated as including the primary controller 588 and the secondary controller 587 with a communication link 589 between the controllers 587 and 588. As illustrated, the secondary controller 587 further includes a switch request circuit 592, and is coupled to a secondary drive signal 590.

The example power converter 500 shown in FIG. 5 shares some similarities with the power converter 100 illustrated in FIG. 1. Controller 594 includes a primary controller 588, which in one example may be substantially similar to controller 144 of FIG. 1 to generate drive signal 545 to control switching of power switch S1 534. However, the output rectifier 521 of power converter 500 illustrated in FIG. 5 is exemplified as a synchronous rectifier circuit, and the controller 594 may also include a secondary controller 587 to generate secondary drive signal 590 to control the synchronous rectifier circuit of output rectifier 521. It should also be appreciated that certain elements that were illustrated in FIG. 1 in detail for explanation purposes have been omitted from FIG. 5 so as not to obscure the teachings of the present invention. Similarly named and numbered elements are coupled and function as described above.

As shown in the example depicted in FIG. 5, the synchronous rectifier 521 is coupled to the secondary winding 516 and the output capacitor C1 520. In the example shown, the synchronous rectifier 521 includes a switch (exemplified as a transistor) and a diode. In one example, the diode may be an externally connected Schottky diode. The synchronous rectifier 521 is coupled to receive the secondary drive signal 590 from the secondary controller 587. Primary controller 588 and the secondary controller 587 may be implemented as monolithic integrated circuits or may be implemented with discrete electrical components or a combination of discrete and integrated components. Primary controller 588, secondary controller 587, and switch S1 534 could form part of an integrated circuit that is manufactured as either a hybrid or monolithic integrated circuit. However it should be appreciated that both the primary controller 588 and the secondary controller 587 need not be included in a single controller package.

The primary controller 588 is coupled to output the drive signal $U_D$ 554 to control switching of the power switch S1 534, and secondary controller 587 is coupled to output the secondary drive signal 590 to control switching of the synchronous rectifier 521. Primary controller 588 and secondary controller 587 may communicate via a communication link 589.

Similar to FIG. 1, the secondary controller 587 receives the feedback signal $U_{FB}$ 531 and can determine whether the power switch S1 534 should be turned on during a given switching cycle period, or the duration of time that switch S1 534 should be turned on during a switching cycle period. The secondary controller 587 may send a command to the primary controller 588 via the communication link 589 to control power switch S1 534. The primary switch S1 534 and the synchronous rectifier 521 are generally not turned on at the same time.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A controller for use in a power converter, comprising:
  a drive circuit coupled to generate a drive signal to control switching of a power switch of the power converter in response to a current sense signal representative of a current through the power switch, and in response to a feedback signal representative of an output of the power converter, to control a transfer of energy from an input of the power converter to the output of the power converter;
  a current limit generator coupled to generate a current limit signal responsive to a load coupled to the output of the power converter, wherein the drive circuit is coupled to generate the drive signal further in response to the current limit signal;
  an exclusion frequency range detection circuit coupled to receive the drive signal to generate a frequency skip signal in response to the drive signal to indicate when an intended frequency of the drive signal is within an exclusion frequency window such that the current limit signal generated by the current limit generator is unvarying for at least a switching cycle when the frequency skip signal indicates that the intended frequency of the drive signal is within the exclusion frequency window; and
  a first latch coupled to generate a hold signal coupled to control the current limit generator to hold the current limit signal, wherein the first latch is coupled to generate the hold signal in response to the frequency skip signal generated by the exclusion frequency range detection circuit, and in response to the feedback signal representative of the output of the power converter.

2. The controller of claim 1, further comprising:
a second latch coupled to generate a pause signal coupled to control the current limit generator to latch the current limit signal, wherein the second latch is coupled to generate the pause signal in response to the frequency skip signal generated by the exclusion frequency range detection circuit, and in response to the feedback signal representative of the output of the power converter;
a first logic gate having an output coupled to be received by the first latch and the second latch, wherein the first logic gate has a first input coupled to receive the frequency skip signal generated by the exclusion frequency range detection circuit, wherein the first logic gate has a second input coupled to be responsive to the feedback signal representative of the output of the power converter;
a second logic gate having a first input coupled to receive an output of the first latch, wherein the second logic gate has a second input coupled to be responsive to the feedback signal representative of the output of the power converter; and
a third logic gate having an output coupled to be received by the current limit generator, wherein the second logic gate has a first input coupled to receive an output of the second logic gate, wherein the third logic gate has a second input coupled to be responsive to the frequency skip signal generated by the exclusion frequency range detection circuit.

3. The controller of claim 1, wherein the exclusion frequency range detection circuit comprises:
a third latch coupled to be set in response to the drive signal;
a first frequency threshold circuit coupled to be responsive to an output of the third latch to output first frequency signal to indicate whether a pulse of the drive signal has been detected at a frequency above a first threshold frequency;
a second frequency threshold circuit coupled to be responsive to the output of the third latch to output a second frequency signal to indicate whether the pulse of the drive signal has been detected at a frequency below a second threshold frequency; and
a fourth logic gate coupled to generate the frequency skip signal in response to the third latch, the first frequency threshold circuit, and the second frequency threshold circuit to indicate that the frequency of the drive signal is within the exclusion frequency window, wherein the exclusion frequency window is between the first threshold frequency and the second threshold frequency.

4. The controller of claim 3, wherein the third latch is coupled to be reset in response to the first frequency threshold circuit and the second frequency threshold circuit.

5. The controller of claim 3, wherein the first frequency threshold circuit comprises:
a first current source;
a first capacitor;
a first switch coupled between the first current source and the first capacitor, wherein the first switch is coupled to be switched on and off in response to the output of the third latch;
a second switch coupled between a first end of the first capacitor and a second end of the first capacitor;
a first inverter coupled between the second switch and the output of the third latch, wherein the second switch is coupled to be switched on and off in response to an output of the first inverter; and
a first comparator coupled to the first capacitor to output the first frequency signal in response to a first comparison of a voltage across the first capacitor with a first voltage reference.

6. The controller of claim 5 wherein the second frequency threshold circuit comprises:
a second current source;
a second capacitor;
a third switch coupled between the second current source and the second capacitor, wherein the third switch is coupled to be switched on and off in response to the output of the third latch;
a fourth switch coupled between a first end of the second capacitor and a second end of the second capacitor;
a second inverter coupled between the fourth switch and the output of the third latch, wherein the fourth switch is coupled to be switched on and off in response to an output of the second inverter; and
a second comparator coupled to the second capacitor to output the second frequency signal in response to a second comparison of a voltage across the second capacitor with a second voltage reference.

7. The controller of claim 6, wherein a size of the first capacitor is smaller than a size of the second capacitor.

8. The controller of claim 1, wherein the current limit is unvarying for a maximum of four switching cycles.

9. A power converter, comprising:
an energy transfer element coupled between an input of the power converter and an output of the power converter;
a power switch coupled to the energy transfer element and the input of the power converter;
a sense circuit coupled to generate a feedback signal representative of the output of the power converter; and
a controller coupled to the power switch, wherein the controller includes:
a drive circuit coupled to generate a drive signal to control switching of the power switch of the power converter in response to a current sense signal representative of a current through the power switch, and in response to a feedback signal, to control a transfer of energy from through the energy transfer element;
a current limit generator coupled to generate a current limit signal responsive to a load coupled to the output of the power converter, wherein the drive circuit is coupled to generate the drive signal further in response to the current limit signal;
an exclusion frequency range detection circuit coupled to receive the drive signal to generate a frequency skip signal in response to the drive signal to indicate when an intended frequency of the drive signal is within an exclusion frequency window such that the current limit signal generated by the current limit generator is unvarying for at least a switching cycle when the frequency skip signal indicates that the frequency of the drive signal is within the exclusion frequency window; and
a first latch coupled to generate a hold signal coupled to control the current limit generator to hold the current limit signal, wherein the first latch is coupled to generate the hold signal in response to the frequency skip signal generated by the exclusion frequency detection circuit, and in response to the feedback signal representative of the output of the power converter.

10. The power converter of claim 9, wherein the controller further comprises:
a second latch coupled to generate a pause signal coupled to control the current limit generator to latch the current limit signal, wherein the second latch is coupled to generate the pause signal in response to the frequency skip signal generated by the exclusion frequency detection circuit, and in response to the feedback signal representative of the output of the power converter;
a first logic gate having an output coupled to be received by the first latch and the second latch, wherein the first logic gate has a first input coupled to receive the frequency skip signal generated by the exclusion frequency detection circuit, wherein the first logic gate has a second input coupled to be responsive to the feedback signal representative of the output of the power converter;
a second logic gate having a first input coupled to receive an output of the first latch, wherein the second logic gate has a second input coupled to be responsive to the feedback signal representative of the output of the power converter; and
a third logic gate having an output coupled to be received by the current limit generator, wherein the second logic gate has a first input coupled to receive an output of the second logic gate, wherein the third logic gate has a second input coupled to be responsive to the frequency skip signal generated by the exclusion frequency detection circuit.

11. The power converter of claim 9, wherein the exclusion frequency detection circuit comprises:
a third latch coupled to be set in response to the drive signal;
a first frequency threshold circuit coupled to be responsive to an output of the third latch to output first frequency signal to indicate whether a pulse of the drive signal has been detected at a frequency above a first threshold frequency;
a second frequency threshold circuit coupled to be responsive to the output of the third latch to output a second frequency signal to indicate whether the pulse of the drive signal has been detected at a frequency below a second threshold frequency; and
a fourth logic gate coupled to generate the frequency skip signal in response to the third latch, the first frequency threshold circuit, and the second frequency threshold circuit to indicate that the frequency of the drive signal is within the exclusion frequency window, wherein the exclusion frequency window is between the first threshold frequency and the second threshold frequency.

12. The power converter of claim 11, wherein the third latch is coupled to be reset in response to the first frequency threshold circuit and the second frequency threshold circuit.

13. The power converter of claim 11, wherein the first frequency threshold circuit comprises:
a first current source;
a first capacitor;
a first switch coupled between the first current source and the first capacitor, wherein the first switch is coupled to be switched on and off in response to the output of the third latch;
a second switch coupled between a first end of the first capacitor and a second end of the first capacitor;
a first inverter coupled between the second switch and the output of the third latch, wherein the second switch is coupled to be switched on and off in response to an output of the first inverter; and
a first comparator coupled to the first capacitor to output the first frequency signal in response to a first comparison of a voltage across the first capacitor with a first voltage reference.

14. The power converter of claim 13, wherein the second frequency threshold circuit comprises:
a second current source;
a second capacitor;
a third switch coupled between the second current source and the second capacitor, wherein the third switch is coupled to be switched on and off in response to the output of the third latch;
a fourth switch coupled between a first end of the second capacitor and a second end of the second capacitor;
a second inverter coupled between the fourth switch and the output of the third latch, wherein the fourth switch is coupled to be switched on and off in response to an output of the second inverter; and
a second comparator coupled to the second capacitor to output the second frequency signal in response to a second comparison of a voltage across the second capacitor with a second voltage reference.

15. The power converter of claim 14, wherein a size of the first capacitor is smaller than a size of the second capacitor.

16. The power converter of claim 9, further comprising a rectifier coupled the output of the power converter to rectify the output of the power converter.

17. The power converter of claim 16, wherein the rectifier comprises a diode.

18. The power converter of claim 16, wherein the rectifier is a synchronous rectifier circuit comprising a switch coupled to rectify the output of the power converter.

19. The power converter of claim 18, further comprising a secondary controller coupled to generate a secondary control signal coupled to be received by the synchronous rectifier circuit to rectify the output of the power converter in response to the feedback signal.

20. The power converter of claim 9, wherein the current limit is unvarying for a maximum of four switching cycles.

21. The power converter of claim 9, wherein the exclusion frequency window is in the range of 7 kHz to 15 kHz.

* * * * *